US009501408B2

(12) United States Patent
Dusanapudi et al.

(10) Patent No.: US 9,501,408 B2
(45) Date of Patent: Nov. 22, 2016

(54) EFFICIENT VALIDATION OF COHERENCY BETWEEN PROCESSOR CORES AND ACCELERATORS IN COMPUTER SYSTEMS

(71) Applicant: GLOBALFOUNDRIES Inc., Grand Cayman (KY)

(72) Inventors: Manoj Dusanapudi, Bangalore (IN); Sairam Kamaraju, Bangalore (IN); Shakti Kapoor, Austin, TX (US)

(73) Assignee: GlobalFoundries Inc., Grand Cayman (KY)

( * ) Notice: Subject to any disclaimer, the term of this patent is extended or adjusted under 35 U.S.C. 154(b) by 629 days.

(21) Appl. No.: 13/770,711

(22) Filed: Feb. 19, 2013

(65) Prior Publication Data

US 2014/0237194 A1 Aug. 21, 2014

(51) Int. Cl.
G06F 12/08 (2016.01)
(52) U.S. Cl.
CPC ......... *G06F 12/0815* (2013.01); *G06F 12/084* (2013.01)
(58) Field of Classification Search
None
See application file for complete search history.

(56) References Cited

U.S. PATENT DOCUMENTS

| 6,373,493 | B1 | 4/2002 | Rickard et al. | |
|---|---|---|---|---|
| 6,883,071 | B2* | 4/2005 | Bushey et al. | 711/141 |
| 7,814,279 | B2 | 10/2010 | Clark et al. | |
| 7,865,675 | B2 | 1/2011 | Paver et al. | |
| 2002/0087809 | A1* | 7/2002 | Arimilli et al. | 711/144 |
| 2002/0087828 | A1* | 7/2002 | Arimilli et al. | 712/32 |
| 2008/0010321 | A1 | 1/2008 | Phan et al. | |
| 2009/0024892 | A1* | 1/2009 | Bussa | G06F 11/263 714/738 |
| 2010/0146210 | A1 | 6/2010 | Habermann et al. | |
| 2011/0252200 | A1* | 10/2011 | Hendry et al. | 711/121 |

OTHER PUBLICATIONS

Lebeck, Alvin R., et al. "Annotated memory references: A mechanism for informed cache management." Euro-Par'99 Parallel Processing. Springer Berlin Heidelberg, 1999. 1251-1254. <https://www.cs.duke.edu/~alvy/papers/ice-euro-long.pdf>.*
Raina, Rajesh and Molyneaux, Robert. "Random Self-Test Method Applications on PowerPCTM Microprocessor Caches". Published Feb. 21, 1998.*
Abd-El-Barr, Mostafa. "Fundamentals of Computer Organization and Architecture". Published Feb. 22, 2005. p. 121-122.*
Sirowy et al. "Clock-Frequency Assignment for Multiple Clock Domain Systems-on-a-Chip". Published in 2007.*

* cited by examiner

*Primary Examiner* — Charles Rones
*Assistant Examiner* — Hewy Li
(74) *Attorney, Agent, or Firm* — Heslin Rothenberg Farley & Mesiti P.C.

(57) ABSTRACT

A method of testing cache coherency in a computer system design allocates different portions of a single cache line for use by accelerators and processors. The different portions of the cache line can have different sizes, and the processors and accelerators can operate in the simulation at different frequencies. The verification system can control execution of the instructions to invoke different modes of the coherency mechanism such as direct memory access or cache intervention. The invention provides a further opportunity to test any accelerator having an original function and an inverse function by allocating cache lines to generate an original function output, allocating cache lines to generate an inverse function output based on the original function output, and verifying correctness of the original and inverse functions by comparing the inverse function output to the original function input.

13 Claims, 4 Drawing Sheets

US 9,501,408 B2

EFFICIENT VALIDATION OF COHERENCY BETWEEN PROCESSOR CORES AND ACCELERATORS IN COMPUTER SYSTEMS

BACKGROUND OF THE INVENTION

Field of the Invention

The present invention generally relates to computer systems, and more particularly to a method of verifying the design of a computer system having a resource such as a cache memory which is shared among multiple devices such as processors and accelerators.

Description of the Related Art

When a new computer system (or subsystem) is designed, it is important to ensure that the design is going to work properly before proceeding with fabrication preparation for the integrated circuit devices making up the system, and their assembly into the finished product. A variety of tests can be performed to evaluate the design, but simulation remains the dominant strategy for functionally verifying high-end computer systems. A design-under-test is driven by vectors of inputs, and states encountered while walking through the sequence are checked for properties of correctness. This process is often performed by software simulation tools using different programming languages created for electronic design automation, including Verilog, VHDL and TDML.

The verification process should include simulation of any shared resources in the design. One typical shared resource in a computer system is a cache memory. In a symmetric, multi-processor (SMP) computer, all of the processing units are generally identical, that is, they all use a common set or subset of instructions and protocols to operate and generally have the same architecture. A processing unit includes a processor core having registers and execution units which carry out program instructions in order to operate the computer, and the processing unit can also have one or more caches such as an instruction cache and a data cache implemented using high-speed memory devices. Caches are commonly used to temporarily store values that might be repeatedly accessed by a processor, in order to speed up processing by avoiding the longer step of loading the values from system memory. These caches are referred to as "on-board" when they are integrally packaged with the processor core on a single integrated chip. Each cache is associated with a cache controller that manages the transfer of data between the processor core and the cache memory. A processing unit can include additional caches such as a level 2 (L2) cache which supports the on-board (level 1) data and instruction caches. Higher-level caches can store a much larger amount of information (program instructions and operand data) than the on-board caches can, but at a longer access penalty. Multi-level cache hierarchies can be provided where there are many levels (L3, L4, etc.) of serially connected caches. The higher-level caches are typically shared by more than one processor core.

In systems which share resources such as cache memories, it is important to ensure that the resource is accessed in a consistent manner among all of the devices that use the resource, e.g., that one processor is not given a value for a cache entry that is inconsistent with a value for the same entry that was given to another requesting processor. A system that implements this consistency is said to be coherent. Different coherency protocols have been devised to control the movement of and write permissions for data, generally on a cache block basis. At the heart of all these mechanisms for maintaining coherency is the requirement that the protocols allow only one requesting device to have a "permission" that allows a write operation to a given memory location (cache block) at any given point in time. To implement cache coherency in a computer system, processors typically communicate over a common generalized interconnect or bus, passing messages indicating their need to read or write memory locations. When an operation is placed on the interconnect, all of the other processors can monitor (snoop) this operation and decide if the state of their caches can allow the requested operation to proceed and, if so, under what conditions. One common cache coherency protocol is the MESI protocol in which a cache block can be in one of four states, M (Modified), E (Exclusive), S (Shared) or I (Invalid). There are many, more complicated protocols which expand upon the MESI protocol. Other features may be implemented with the coherency protocol, such as cache intervention which allows a cache having control over a requested memory block to provide the data for that block directly to another cache requesting the value (for a read-type operation), bypassing the need to write the data to system memory.

Cache coherency may extend beyond processor cores. As computational demands have increased, computer systems have adapted by relying more on other hardware components for specific tasks such as graphics (video) management, data compression, or cryptography. These components are generally referred to as hardware accelerators, and have their own specialized processing units according to their particular functions. The control software for an accelerator typically creates an accelerator-specific control block in system memory. The accelerator reads all the needed inputs from the accelerator-specific control block and performs the requested operations. Some of the fields in the accelerator control block might for example include the requested operation, source address, destination address and operation specific inputs such as key value and key size for encryption/decryption. The usage of system memory by an accelerator leads to the necessity of ensuring coherency with the accelerator in addition to the processors. One low-cost approach to such an accelerator coherency system is described in U.S. Pat. No. 7,814,279.

SUMMARY OF THE INVENTION

The present invention is generally directed to a method of testing coherency in a system design having a shared resource, at least one processor which accesses the shared resource, and at least one accelerator which accesses the shared resource, by selecting an entry of the shared resource for targeted testing during a simulation of operation of the system design, allocating a first portion of the selected entry for use by a first instruction from the processor, allocating a second portion of the selected entry for use by a second instruction from the accelerator, executing the first and second instructions using the allocated first and second portions of the selected entry subject to a coherency protocol adapted to maintain data consistency of the shared resource, and verifying correctness of data stored in the entry. The shared resource may be a cache memory, and the entry a cache line of the cache memory. The first and second portions of the cache line can have different sizes. The processor and the accelerator can operate in the simulation at different frequencies. The first portion of the selected line can be randomly allocated for use by the first instruction, and the second portion of the selected line can be randomly allocated for use by the second instruction. Multiple processors and multiple accelerators can access the cache memory, in which case a single cache line can further be allocated for use by other processors and accelerators. The verification system can control execution of the cached instructions to invoke different coherency modes of the coherency mechanism. The invention provides a further opportunity to test any accelerator having an original function and an inverse function by allocating a first set of cache lines for the accelerator to generate an original function output based on an original function input, allocating a second set of cache lines for the accelerator to generate an inverse function output based on the original function output, and verifying correctness of the original and inverse functions by comparing the inverse function output to the original function input.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED
EMBODIMENT(S)

As growing demands for performance have increased reliance on hardware accelerators, it has become more important and more difficult to ensure that accelerator operations are coherent with respect to memory operations by processors. Coherency within SMP systems is easily validated according to known methods, but coherency across two different mechanisms possibly operating at different frequencies like processors and an off-chip field programmable gate array (FPGA) is a difficult challenge for the design and validation teams. Special alignment requirements and synchronization requirements make it difficult to extract all possible corner errors in regular random tests.

It would, therefore, be desirable to devise an improved method of validating coherency between processors and accelerators which can imitate real world scenarios. It would be further advantageous if the method could efficiently validate accelerators with different coherency modes available in the system to make sure quality of the design is maintained and also give a working model for better throughput in using the accelerators. The present invention achieves these advantages by allocating different portions of a single cache line for use by an accelerator and a processor. In the exemplary embodiment, the validation environment includes a cache whose lines are divided into blocks or sectors which can be accessed independently by a processor and an accelerator. A single cache line can be accessed by multiple accelerators or multiple cores, including different processor operations. This approach enables comprehensive testing for different modes of operation of cache lines, such as intervention by other caches or accesses from memory via the coherency mechanism. While coherency and intervention is managed across cores and caches, accelerators can pull those lines from outside the bus interconnect between processors, thereby generating coherency stress between different mechanisms. The invention accordingly ensures coherency between processors and accelerators by detecting any holes in the hardware design.

Figure 1:
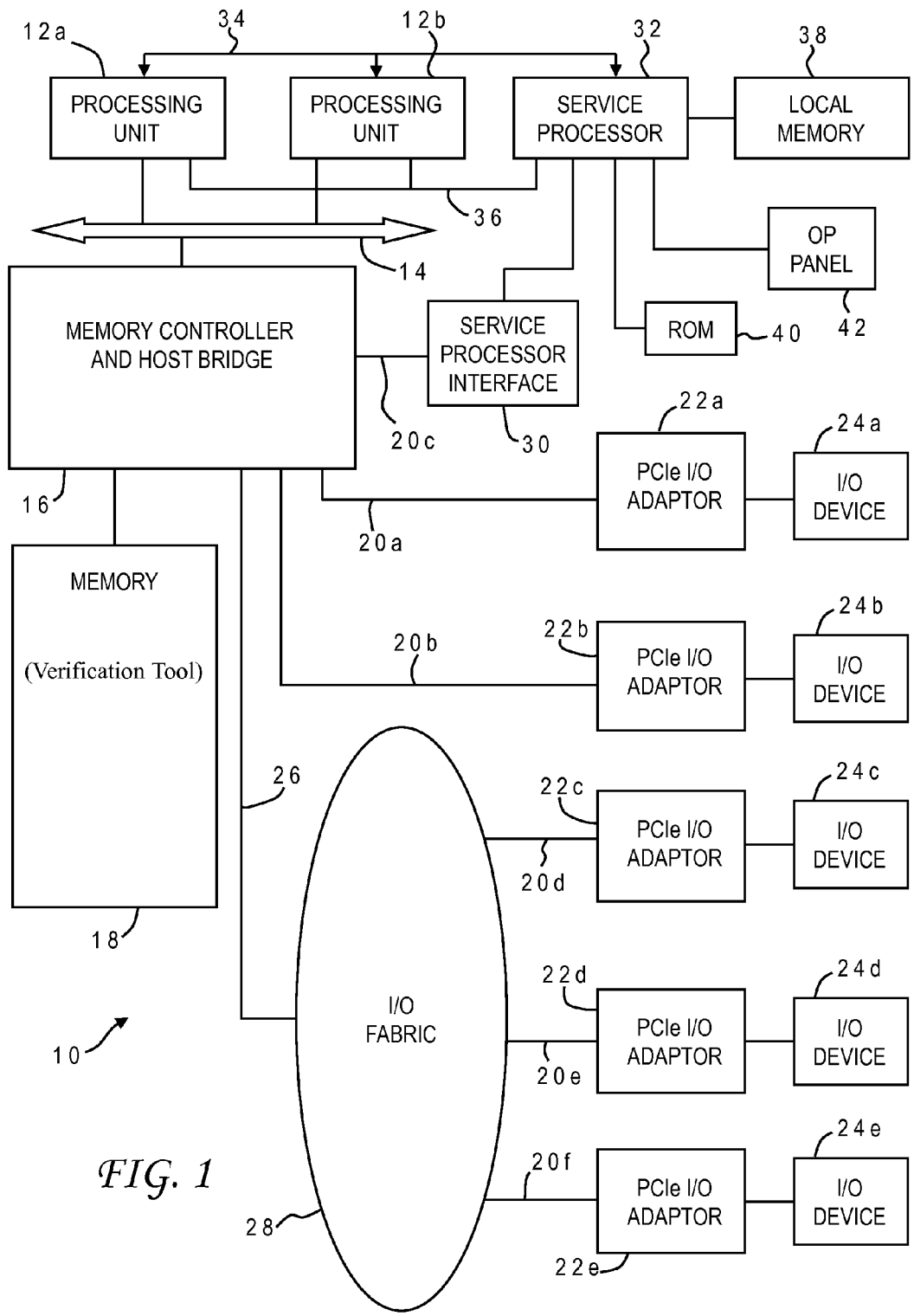
FIG. 1 is a block diagram of a computer system programmed to carry out verification of computer systems in accordance with one implementation of the present invention.

With reference now to the figures, and in particular with reference to FIG. 1, there is depicted one embodiment 10 of a computer system in which the present invention may be implemented to carry out the testing of coherency systems in an integrated circuit design. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the circuit validation application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media excludes transitory media such as propagating signals.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for a coherency validation process that uses novel cache control techniques to stress the coherency mechanisms between processors and accelerators. Accordingly, a program embodying the invention may include conventional aspects of various validation and design tools, and these details will become apparent to those skilled in the art upon reference to this disclosure.

Accelerators generally use specific protocols and interfaces to submit jobs and get results. Issuing a job to these accelerators is typically done through control block structures with specific alignment requirements for accessing these control blocks. So memory accesses from accelerators outside the processor fall into two kinds, accesses to the control block structures, and accesses to the source memory on which accelerators operate. Many of the accelerators do not directly fetch instructions themselves but instead rely on the main processor(s) to assign work to them. The software executing in the main memory (e.g., application program or operating system) creates an accelerator-specific control block in the memory and then initiates the accelerator. The accelerator can read all the needed inputs from the accelerator-specific control block and perform the requested operation. Some of the fields in the accelerator control block could be the requested operation, source address, target address and operation specific inputs such as key value and key size for encryption/decryption. The present invention proposes a method through which the designer can allocate memory for any processor and accelerator mechanisms.

Figure 2:
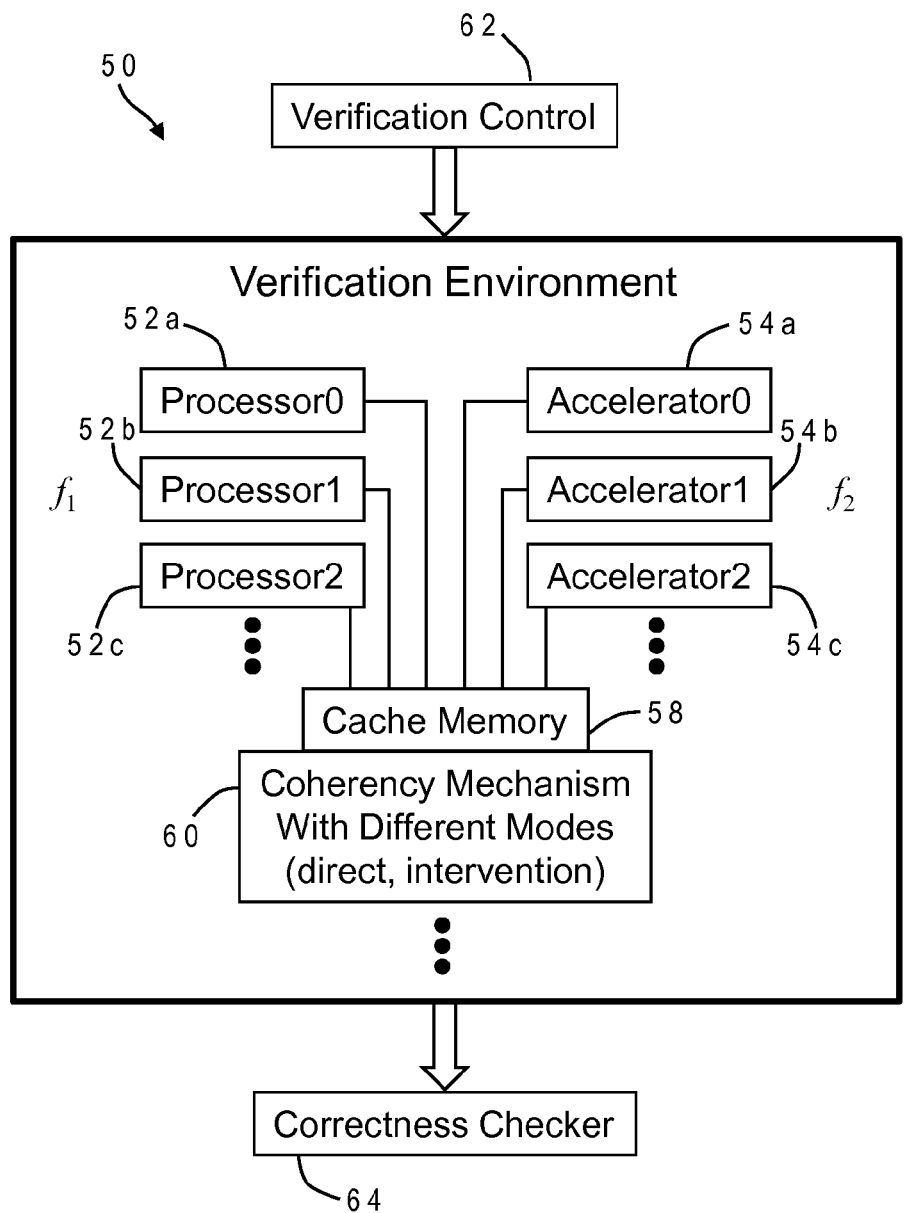
FIG. 2 is a block diagram of a verification environment for a computer system design having multiple processors and accelerators which share access to a cache memory in accordance with one implementation of the present invention.

Referring now to FIG. 2, there is depicted a verification environment 50 for a computer system design which includes multiple processors 52a, 52b, 52c (processor 0, processor 1, processor 2) and multiple accelerators 54a, 54b, 54c (accelerator 0, accelerator 1, accelerator 2). The processors and accelerators access a memory hierarchy of the computer system design, for example through read or write operations, to load values to or store values from memory blocks. The memory hierarchy includes one or more cache memories 58, and a coherency mechanism 60. The processors and accelerators may operate at different frequencies, i.e., the processors operating at a first frequency $f_1$ and the accelerators operating at a second frequency $f_2$ (or multiple frequencies for different accelerators). As those skilled in the art will appreciate, the verification environment may include a variety of other computer system components, not shown, according to the particular design being tested. A verification control program 62 can be used to manage the entire simulation effort. The verification system further includes a correctness checker 64 which can check values (data) computed by environment 50 or values stored in any of the components as the simulation proceeds against predetermined values known to be correct.

As verification environment 50 is a software program structure representing a hardware design, the various components are generally software modules, however, one or more of the components may be implemented in hardware for the verification procedure and subject to verification control 62. The software modules are loaded onto an actual computer system such as computer system 10 to carry out the verification process, and are controlled by commands from verification control 62 which can also reside on computer system 10, along with correctness checker 64. Verification control 62 can command the execution of instructions in such a manner as to test different modes of operation of cache lines. For example, one portion of the cache line can be accessed by another cache memory to satisfy an instruction in a procedure known as cache intervention, as opposed to a mode where the access is directly to or from main memory.

Figure 3:
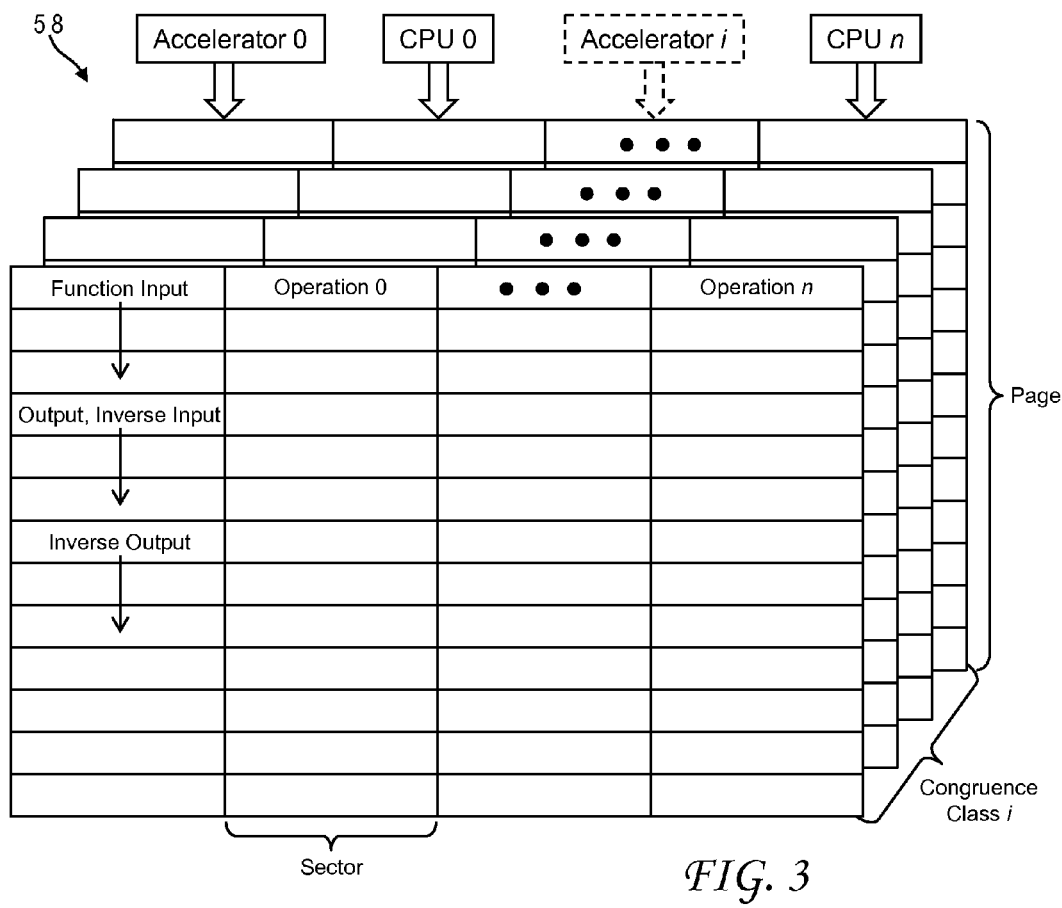
FIG. 3 is a pictorial representation of a simulated cache memory allocated in accordance with one implementation of the present invention wherein a portion of a cache line is used by an accelerator while other portions of the same cache line are used by different processors.

FIG. 3 illustrates one implementation for cache memory 58. Cache memory 58 has a plurality of entries or cache lines which may be arranged in pages and groups or ways according to congruence class mappings. A given cache line is further decomposed into a plurality of blocks or sectors. The sectors may be different sizes such as word, double word, quad word, etc. Verification control 62 can allocate different sectors of a single cache line for use by both accelerators and processors. In FIG. 3, the first sector of the cache lines has been allocated for use by the accelerators, while the remaining sectors have been allocated to different processors or central processing units (CPUs). So for example, the first sector of a given cache line could be allocated to accelerator 54a, the second sector of the cache line could be allocated to processor 52a, the third sector of the cache line could be allocated to processor 52b, and the fourth sector of the cache line could be allocated to processor 52c. Alternatively, different sectors of a single cache line could be allocated for use by different accelerators. Multiple cache lines can be so shared according to the same divisions between blocks. Sectors used by the processors can be used for different operations. A given cache line may be divided into blocks of different sizes. For example, control structures accessed to submit jobs to accelerators often need to be quad word aligned, so the block allocated for an accelerator may be quad word size, but other blocks in the same line allocated to processors may be double word or single word size. This approach enables a cache line to be accessed randomly from different cores to create scenarios of intervention and different allowed coherency states, increasing the stress on coherency mechanism 60. As simulation of the verification environment proceeds, correctness check 64 will sample values throughout the cache lines and compare them to the known correct values to determine whether the coherency mechanism is performing properly. Some examples of the various operations that the processors could be performing include: processor accesses to the cache line for stores and or loads when the accelerator is also trying to access the cache line which can change the state of the cache; scenarios where an accelerator is trying to access the cache line and a processor serves the request (by the process called intervention); and a processor trying to fetch a cache line through a prefetch operation while accelerators are accessing it.

This approach provides a convenient opportunity to test the accuracy of an accelerator. Many accelerators have functionalities which are complementary, i.e., generally opposite (inverse) operations, for example, encryption and decryption, or compression and decompression. The present invention can leverage this feature to validate the correctness of these functionalities. In such a case, as depicted in FIG. 3, a first contiguous set of cache lines in a page can be allocated for a control structure of the execution block for the accelerator, to invoke the first functionality. A second contiguous set of cache lines in the same page, immediately following the first set (consecutive), is allocated for a control structure of the execution block for the same accelerator, but the second set invokes the second, opposite functionality. The second set of cache lines will use the output of the first function as the input to the second function. A third set of contiguous cache lines in the same page (consecutive to the second set) is used for the output of the second function, which should be exactly the same as the original input to the first function. The number of cache lines in the sets depends on the particular control block structure for the accelerator.

Figure 4:
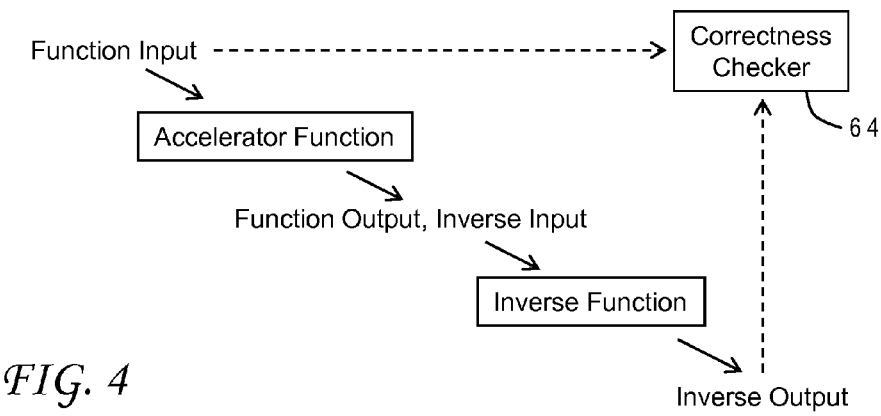
FIG. 4 is a chart depicting how the cache memory blocks used by an accelerator can be assigned for a function of the accelerator and an inverse of the function to yield an output which is the same as the original function input in accordance with one implementation of the present invention.

Accordingly, as seen in FIG. 4, the first set of cache lines are used by the accelerator to generate the original function output, which then becomes in the inverse input, i.e., input to the inverse function. When the inverse function of the accelerator acts on the inverse input, it generates an inverse output, which should be the same as the original function input. These two values can then be compared by correctness checker 64 to validate the functionalities of the accelerator. In this manner, the operation of any accelerator which has opposite functionalities can be validated as the coherency mechanism is contemporaneously validated. It does not matter which of the two functions is designated as the original and which is designated as the inverse, e.g., for an encryption accelerator the verification control could designate the encryption function as the original function and the decryption function as the inverse function, or could alternatively designate the decryption function as the original function and the encryption function as the inverse function.

Figure 5:
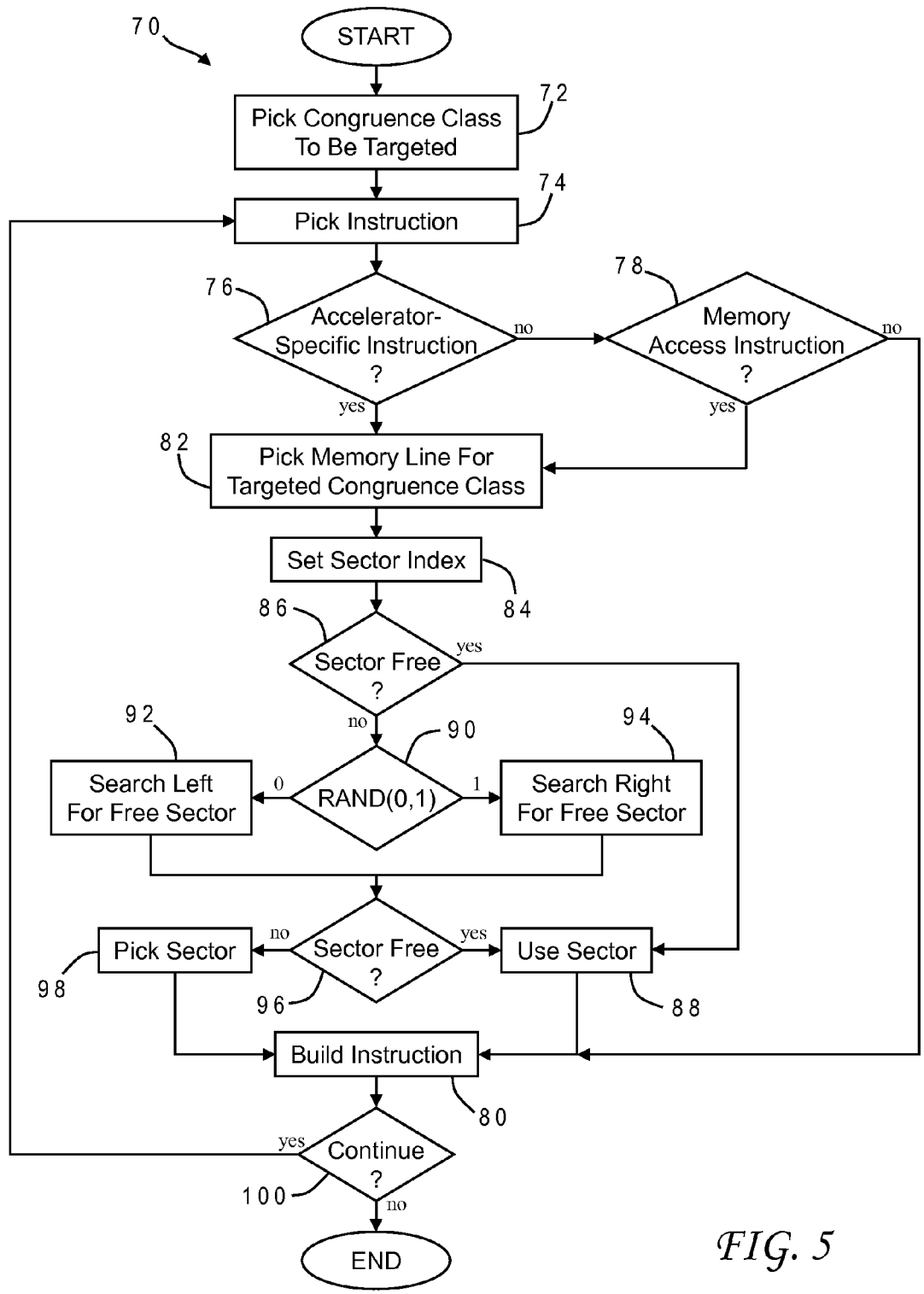
FIG. 5 is a chart illustrating the logical flow for a coherency testing process in accordance with one implementation of the present invention.

The invention may be further understood with reference to the chart of FIG. 5 which illustrates the logical flow for a specific coherency testing process in accordance with one implementation carried out by computer system 10. Process 70 begins by selecting a congruence class to target (72), and selecting an instruction to apply to the cache memory (74). The congruence class and instruction may be selected according to any algorithm devised by the designer, or may be selected randomly. A check is then made to determine whether the instruction is accelerator-specific (76) or is for memory access (78). If the instruction is neither, then verification control 62 builds the instruction accordingly to conventional testing methodology (80). If the instruction is accelerator-specific or is for memory access, a memory line is selected for the instruction within the targeted congruence class (82), and a sector index for that line is set (84). The line and index may also be selected randomly or accordingly to other designer conditions. If the sector associated with the set sector index is free (86), that sector is used to build the instruction (88). If the sector indicated by the index is not free, a random number generator is used to pick an adjacent sector for examination (90), searching either to the left (92) or to the right (94) until a free sector is found. If a sector is free (96), that sector is used (88); otherwise, any sector is picked according to designer preferences or randomly (98).

After any instruction is built by verification control 62, the process repeats iteratively at box 74 with additional instructions for as long as the verification process continues (100). Termination criteria may be based for example on elapsed time or a predetermined number of instructions being built.

The invention achieves several advantages by allowing processors and accelerators to share the same set of cache lines. Since the processors can be generating random values during simulation, accelerators sharing the lines can be tested with different memory values. Different alignments of control blocks can also be validated. As processors and accelerators fight for the same set of cache lines, not only is the coherency mechanism tested but snoop and bus arbitration are also stressed. In particular, accelerators working at different frequencies than processors will result in different timing of snoop broadcasts on the interconnect bus. Execution of accelerator workloads can be sped up as memory lines used by the accelerators can be brought in earlier by the processor cores. In real world applications, the novel allocation of cache lines can prepare inputs for the accelerators ahead of the needed time, achieving maximum throughput. Finally, for accelerators having inverse functions, correctness validation of the accelerator functionality happens with much faster coverage of all corner cases, and no software simulation is needed to check the correctness of these functionalities.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been disclosed in the context of a cache memory, it is applicable to any shared resource that allows accesses from both processors and accelerators. It is therefore contemplated that such modifications can be made without departing from the spirit or scope of the present invention as defined in the appended claims.

What is claimed is:

1. A computer system comprising:
   one or more processors which process program instructions;
   a memory device connected to the one or more processors; and
   program instructions residing in the memory device for testing coherency in a system design having a shared resource, at least one processor of the one or more processors which accesses the shared resource, and at least one accelerator which accesses the shared resource, by selecting an entry of the shared resource for targeted testing during a simulation of operation of the system design, wherein the shared resource is a cache memory and the entry is a cache line of the cache memory, allocating a first portion of the selected entry for use by one or more first instructions from the at least one processor, allocating a second portion of the selected entry for use by one or more second instructions from the at least one accelerator, executing the one or more first instructions and the one or more second instructions using the allocated first and second portions of the selected entry subject to a coherency protocol adapted to maintain data consistency of the shared resource, and verifying correctness of data stored in the entry, wherein the verifying determines that the at least one processor and the at least one accelerator can share the entry, and wherein the at least one accelerator has an original function and an inverse function which is opposite to the original function, and the program instructions further allocate a first set of entries of the shared resource for the accelerator to generate an original function output based on an original function input, allocate a second set of entries of the shared resource for the at least one accelerator to generate an inverse function output based on the original function output, and verify correctness of the original and inverse functions by comparing the inverse function output to the original function input.

2. The computer system of claim 1 wherein the at least one processor and the at least one processor accelerator operate in the simulation at different frequencies.

3. The computer system of claim 1 wherein the first portion of the selected entry is randomly allocated for use by the one or more first instructions, and the second portion of the selected entry is randomly allocated for use by the one or more second instructions.

4. The computer system of claim 1 wherein multiple processors access the shared resource, and the program instructions further allocate a third portion of the selected entry for use by one or more third instructions from a second processor.

5. The computer system of claim 1 wherein multiple accelerators access the shared resource, and the program instructions further allocate a third portion of the selected entry for use by one or more third instructions from a second accelerator.

6. A computer program product comprising:

a computer-readable storage medium; and program instructions residing in the storage medium for testing coherency in a system design having a shared resource, at least one processor which accesses the shared resource, and at least one accelerator which accesses the shared resource, by selecting an entry of the shared resource for targeted testing during a simulation of operation of the system design, wherein the shared resource is a cache memory and the entry is a cache line of the cache memory, allocating a first portion of the selected entry for use by one or more first instructions from the at least one processor, allocating a second portion of the selected entry for use by one or more second instructions from the at least one accelerator, executing the one or more first instructions and the one or more second instructions using the allocated first and second portions of the selected entry subject to a coherency protocol adapted to maintain data consistency of the shared resource, and verifying correctness of data stored in the entry, wherein the verifying determines that the at least one processor and the at least one accelerator can share the entry, and wherein the at least one accelerator has an original function and an inverse function which is opposite to the original function, and the program instructions further allocate a first set of entries of the shared resource for the at least one accelerator to generate an original function output based on an original function input, allocate a second set of entries of the shared resource for the accelerator to generate an inverse function output based on the original function output, and verify correctness of the original and inverse functions by comparing the inverse function output to the original function input.

7. The computer program product of claim 6 wherein the at least one processor and the at least one accelerator operate in the simulation at different frequencies.

8. The computer program product of claim 6 wherein the first portion of the selected entry is randomly allocated for use by the one or more first instructions, and the second portion of the selected entry is randomly allocated for use by the one or more second instructions.

9. The computer program product of claim 6 wherein multiple processors access the shared resource, and the program instructions further allocate a third portion of the selected entry for use by one or more third instructions from a second processor.

10. The computer program product of claim 6 wherein multiple accelerators access the shared resource, and the program instructions further allocate a third portion of the selected entry for use by one or more third instructions from a second accelerator.

11. A verification tool comprising:

a verification environment for simulating a system design having a cache memory, plurality of processors which access the cache memory, a plurality of accelerators which access the cache memory, and a coherency mechanism adapted to maintain data consistency of the cache memory, wherein the processors and the accelerators operate during simulation at different frequencies;

a verification control module which selects a line of the cache memory for targeted testing during a simulation of operation of the system design, allocates first portions of the selected line for use by instructions from the processors, allocates second portions of the selected line for use by instructions from the accelerators, and commands execution of the first and second instructions using the allocated first and second portions of the selected line subject to the coherency mechanism; and a correctness checker module which verifies correctness of data stored in the cache memory, wherein the verifying determines that the processors and the accelerators can share the line of the cache memory, wherein at least one of the accelerators has an original function and an inverse function which is opposite to the original function, the verification control module further allocates a first set of lines of the cache memory for the at least one accelerator to generate an original function output based on an original function input, and allocates a second set of lines of the cache memory for the at least one accelerator to generate an inverse function output based on the original function output, and the correctness checker module verifies correctness of the original and inverse functions by comparing the inverse function output to the original function input.

12. The verification tool of claim 11 wherein at least two of the first and second portions of the cache line have different sizes.

13. The verification tool of claim 11 wherein the verification control module commands execution of the first and second instructions subject to two different coherency modes of the coherency mechanism.

* * * * *